Nov. 14, 1967  B. D. POWER  3,352,535
CAM ACTUATED GATE VALVE

Filed June 8, 1965  2 Sheets-Sheet 1

BASIL D. POWER,
INVENTOR

BY Hall + Houghton

ATTORNEY

United States Patent Office 3,352,535
Patented Nov. 14, 1967

3,352,535
CAM ACTUATED GATE VALVE
Basil Dixon Power, Horsham, England, assignor to Edwards High Vacuum International Limited, Crawley, England, a British company
Filed June 8, 1965, Ser. No. 462,374
Claims priority, application Great Britain, June 8, 1964, 23,626/64
8 Claims. (Cl. 251—204)

ABSTRACT OF THE DISCLOSURE

A gate valve having a composite closure member comprising a main plate capable of withstanding a high pressure differential across its surfaces and a light closure plate having a number of pressure relief apertures. The apertured plate is controllably movable away from the main plate to compress a seal against a valve seat. At the same time there is an effective seat across the peripheries of the two plates. The complete closure member is mounted for transverse movement across the valve seat after which the said controlled relative movement between the two plates is effected for finally closing the valve.

This invention relates to gate valves and has for its object to provide an improved construction and method of operation of such valves.

A gate or slide valve has an aperture which is completely sealed by a plate when closed and left unimpeded when open. Large gate valves, that is valves whose aperture is greater than twelve inches diameter, frequently have the sealing plate transported laterally by a trolley. The wheels or runners for the trolley may be positioned outside the valve aperture. The valve aperture is closed by transporting the trolley and valve plate from the open position, which is to one side of the aperture, to the closed position, which is directly beneath the aperture. At the final stages of movement the valve plate is first arrested by means of a stop at the end of its desired travel and the trolley allowed to overrun a short distance. This overrun is used to impart an axial movement to the valve plate transmitted from the trolley to the valve plate by either leading swing links or cams and rollers. A sealing ring contained in the top surface of the valve plate is then compressed against the surrounding material of the aperture. To open the valve, the reverse action takes place. The initial movement of the trolley permits the valve plate to move axially away from the aperture and then both trolley and valve plate are transported laterally to one side of the aperture.

The limitations of existing designs have made the construction of large gate valves massive and expensive.

For gate valves with apertures in excess of, say 12 inches diameter, the load applied to the plate and to the trolley assembly is very great when sealing against a pressure differential of, say, one atmosphere. This high loading can cause distortion to the valve plate which must be supported robustly at several points by members of the lifting mechanism. The lifting mechanism and trolley must be of strong, heavy construction to withstand the stresses emposed. Inadequately robust engineering can result in distortion and seizure. Successful designs have thus become very expensive to produce and often require considerable force to operate them reliably.

The present invention is concerned with eliminating the high loading on the lifting mechanism and trolley caused by the pressure differential across the valve in the closed position. The load on the lifting mechanism is so much reduced that for a given size of valve, the components of the lifting mechanism can be relatively smaller and of lighter construction but still ensuring easy and reliable operation. The trolley, as such is completely eliminated. The invention can be applied to very large valves and a gate valve of thirty-six inches diameter becomes a much more practical and economical proposition.

According to the present invention, a gate or slide valve is provided with a closure member of composite construction and including a flat member capable of resisting full atmospheric differential pressure and a second flat member which is capable of limited axial movement relatively to the first member and is vented so that no substantial pressure difference can be sustained between its opposite faces, the second member being so mounted that it can displace and compress against the valve seating a sealing member attached to the flat member in a leak tight-manner.

In a preferred construction of valve embodying the invention, means are provided to effect lateral traverse of the closure member and then to effect raising of the second member to effect compression of the sealing member against the valve seating. In the preferred construction the second member is accommodated within a recess in the flat member and is positioned with respect thereto by a plurality of locating pins embraced by compression springs which normally serve to hold the second member closely in engagement with the flat member. The sealing member is an elastomer gasket attached to the periphery of the flat member and extends inwardly beyond the periphery of the second member which is provided with a central boss projecting through an aperture in the flat member, a flexible diaphragm attached to the boss and the flat member serving to provide a sealing connection between the second member and the flat member.

One form of means for effecting lateral traverse of the closure member may conveniently consist of a "lazy-tongs" linkage located within the valve housing and operated externally of the housing via a gas-tight seal.

One construction of gate valve embodying the invention will now be described in greater detail by way of example with reference to the accompanying drawings in which.

Figure 1:
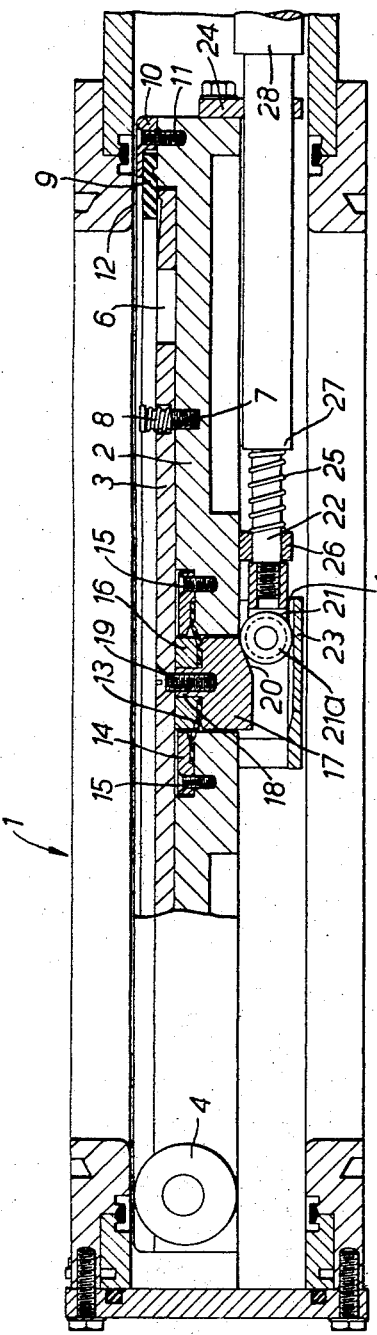
FIGURE 1 is a sectional elevation showing the main components of the valve and taken on the line A—A of FIGURE 2.
Figure 2:
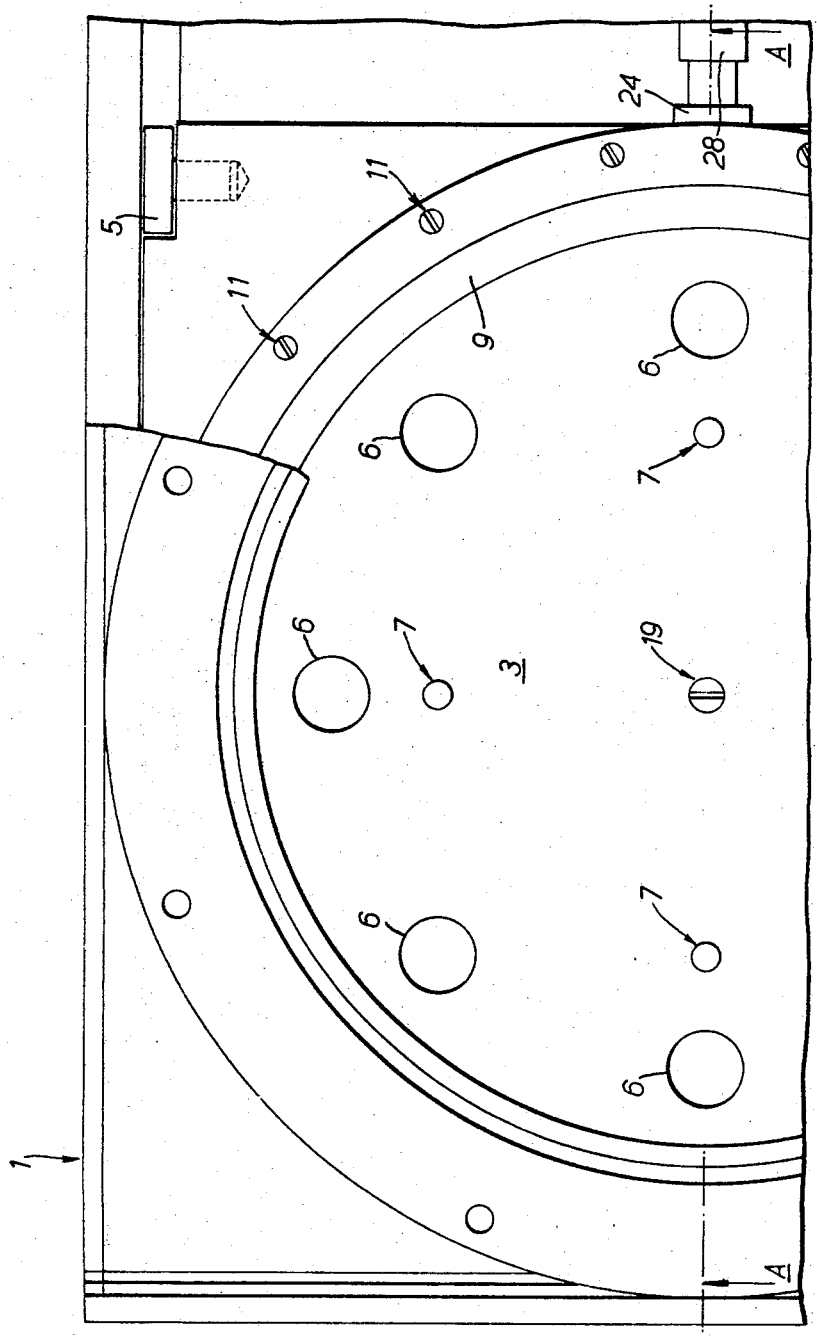
FIGURE 2 is a partial plan view.

Referring to the drawings, the body of the valve is indicated generally at 1 and houses a valve plate consisting of two main members namely a robust lower plate 2 which is made strong enough to resist full atmospheric pressure differential and an upper light steel disc 3. The plate 2 is supported on wheels of which only one 4 is shown in FIGURE 1 and another 5 in FIGURE 2. The wheels are sufficient in number to give support at multiple points and to ensure easy travel of the plate within the body of the valve. Instead of travelling on wheels the plate may be arranged to slide in which case it would be supported all along on both sides.

The top face of the lower plate 2 is formed with a circular recess of large diameter within which the steel disc 3 is accommodated. The disc is pierced to provide several vent holes 6 and is located within the recess on guide pins 7 of which only one is shown. Compression springs 8 embracing the pins 7 serve to hold the disc 3 against the bottom of the recess. An elastomer gasket 9 is clamped to the boundary edge of the recessed portion of the plate 2 by a flanged ring 10 held by screws 11 to the plate 2. The gasket extends radially inwardly over the recess so that the extending portion is flexibly capable of being raised to engage the sealing surface 12 of the valve body.

A diaphragm 13 disposed at the centre of the plate 2 is clamped in position by a flanged ring 14 secured by screws 15. The centre of the diaphragm is held between a ring 16 and a block 17 formed with a hollow boss 18 over which the ring 16 fits, a screw 19 serving to secure the ring 16, the diaphragm 13 and the block 17 as an assembly to the disc 3.

The underside of the block 17 has an inclined portion 20 to form a wedge face which is engaged by a roller 21 carried by a laterally movable shaft 22. The roller 21 is the middle one of three rollers, the outer rollers, of which one 21a is shown in broken lines, being of slightly smaller diameter than roller 21. The rollers 21a run on a platform 23 which is formed with a slot 23d in which the roller 21 runs clear as it will be appreciated that the roller 21 will rotate in a direction opposite to the direction of rotation of the rollers 21a. The shaft 22 is supported in a bracket 24. Normally the roller 21 is held retracted from the block by a spring 25 acting between a stop 26 and a shoulder 27 on the shaft 22.

In operation, lateral movement of the valve plate assembly is achieved by any conventional mechanism thrusting or pulling on an extension 28 of the shaft 22. As previously indicated this shaft is spring loaded towards the "unlifted" position. When the valve plate assembly is moved laterally towards the "closed" position no lifting occurs until the lower plate 2 completes its travel and abuts a stop. Further motion of the spring loaded shaft 22 then compresses the spring 25 and moves the roller 21 relative to the wedge face 20 to produce a lifting action which is transmitted via the block 17 and ring 16 to the disc 3 against the thrust of the springs 8. When the steel disc 3 is thus lifted it lifts the inner portion of the annular disc 3 elastomer gasket 9 and compresses it against the surface 12 of the valve body to make a leak-tight seal. Because the steel disc is vented by holes 6 and there is little difference between the free areas of its upper and lower surfaces, there will not be any substantial pressure difference across it. Thus the roller and wedge mechanism need only have little strength over and above that required to resist the compressive forces in the springs 8 and the elastomer and forces due to pressure differentials over small areas of free elastomer. The roller and wedge mechanism may therefore be of light and simple construction. Main forces due to pressure differentials are resisted by the well supported lower plate 2 and because the lower plate is static when the lifting force is applied to the valve plate assembly, the risk of seizure between the lower plate and its supporting guides is eliminated.

The construction described is applicable with advantage to gate valves of aperture diameter about twelve inches or over. Thus, where it is required to seal large apertures against relatively high pressure differentials, a pressure balanced device for applying compression to the seal in the manner described provides an inexpensive and reliable solution to the many problems usually encountered.

Figure 3:
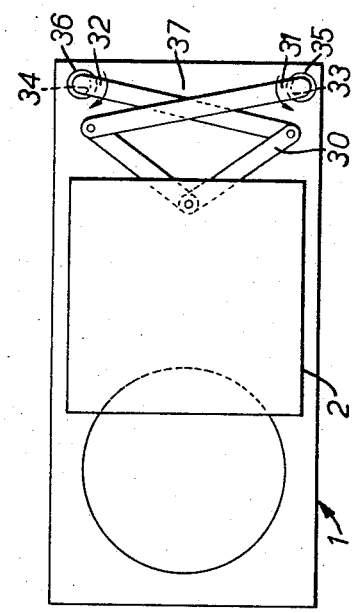
FIGURE 3 is a diagrammatic representation of a form of means for effecting traverse of the closure member.

The lateral movement of the valve plate assembly, as previously stated, can be achieved by conventional means, but an advantageous arrangement is shown diagrammatically in FIGURE 3 of the drawings. A "lazy-tongs" linkage 30 is attached to a member, not shown, but equivalent in function to the shaft 22 and the ends 31 and 32 of the linkage are connected to shafts 33, 34 which extend through seals 35, 36 in the wall 37 of the valve housing. The shafts 33, 34 are rotatable by any convenient means and on partial rotation effect extension or contraction of the "lazy-tongs" linkage which in turn effect traverse of the plate 2. The thrust balanced linkage 38 provides smooth operation with a minimum of wear on the guides and runners.

As an alternative to the arrangement described with reference to FIGURE 3, a simplified form of linkage may be used where the size of valve permits. Thus the linear traverse of the valve plate may be produced by a radial arm operative on a member equivalent in function to the shaft 22 and connected at one end to a single pivoted link and at the other end to a shaft extending through a rotary seal in the wall of the valve housing.

Another possible means for effecting traverse of the valve plate comprises a pneumatic or hydraulic actuator the piston rod of which extends through a sliding or bellows seal in the end wall of the valve housing and constitutes the extension 28 of the shaft 22 or an equivalent member.

I claim:
1. A gate valve including a valve housing, a valve seat defining a valve aperture, a closure member of composite construction and laterally traversable means for moving said closure member across said aperture, said closure member comprising in combination:
    (a) a first substantially flat member capable of withstanding full atmospheric pressure;
    (b) a second substantially flat member adapted to abut said first member in face-to-face relationship and being formed with at least one pressure relief aperture which ensures substantial pressure equalisation across said second member;
    (c) connecting means between said first and second members to allow limited movement away from said position of face-to-face relationship;
    (d) control means associated with said connecting means controllably to effect said limited movement;
    (e) first sealing means between the periphery of said second member and said valve seat for compression therebetween on said limited movement; and
    (f) second sealing means comprising a flexible annular sealing member attached to the periphery of said first member and extending inwardly to said second member to provide an effective seal between the peripheries of said first and said second members when said limited movement is effected.

2. A valve according to claim 1 in which said first and second sealing means together comprise a single flexible sealing ring which is attached at its outer periphery to the periphery of said first member and which extends inwardly over the periphery of said second member.

3. A valve according to claim 1 in which said second member is accommodated within a recess in said first member.

4. A valve according to claim 1 in which said connecting means comprises a plurality of locating pins embraced by associated compression springs, said springs biasing said second member towards said first member.

5. A valve according to claim 1 in which said second member is provided with a central boss and said first member is formed to define a central aperture which receives said boss, a flexible diaphragm seal being attached both to said boss and to that part of said first member which defines said central apertures.

6. A valve according to claim 5 in which said control means forms part of said laterally traversable means and is cooperable with said boss for effecting said limited movement.

7. A valve according to claim 6 including a "lazy-tongs" linkage located within said valve housing and connected to actuate said laterally traversable means, said "lazy-tongs" linkage being operated by actuating means passing into said valve housing via a gas-tight seal.

8. A gate valve including a valve housing, a valve seat defining a valve aperture, a closure member of composite construction and laterally traversable means for moving said closure member across said aperture, said closure member comprising in combination:
    (a) a first substantially flat member formed with a central aperture and capable of withstanding full atmospheric pressure;
    (b) a second substantially flat member provided with a central boss which passes through said central aperture whereby said first member and said second member may abut one another in substantial face-to-face relationship, said second member being formed with at least one pressure relief aperture which ensures substantial pressure equalisation across said second member;

(c) a flexible diaphragm seal attached both to said boss and to that part of said first member which defines said central aperture;

(d) connecting means between said first and second members to allow limited movement away from said position of face-to-face relationship;

(e) control means forming part of said laterally traversable means which is co-operable with said boss for effecting said limited movement allowed by said connecting means, and (f) sealing means comprising a flexible annular sealing member which is attached to the periphery of said first member and which extends inwardly over the periphery of said second member, said limited movement serving to compress said sealing member between said periphery of said second member and said valve seat.

References Cited

UNITED STATES PATENTS

| | | | |
|---|---|---|---|
| 2,203,399 | 6/1940 | Wheatley | 251—158 |
| 2,819,034 | 1/1958 | Holderer | 251—158 X |
| 2,858,096 | 10/1958 | Worren | 251—175 X |
| 3,033,515 | 5/1962 | Brisbone | 251—175 |
| 3,072,378 | 1/1963 | Holderer | 251—204 X |
| 3,130,952 | 4/1964 | Meyer | 251—317 X |
| 3,241,807 | 3/1966 | Holderer | 251—158 |

CLARENCE R. GORDON, *Primary Examiner.*